United States Patent [19]

Nagai et al.

[11] Patent Number: 5,067,733
[45] Date of Patent: Nov. 26, 1991

[54] MECHANICAL SEAL INCLUDING A SPLIT SEAL RING

[75] Inventors: Yataro Nagai; Mitsuyoshi Matsushita; Yuji Yamauchi, all of Tokyo, Japan

[73] Assignee: Tanken Seiko Kabushiki Kaisha, Tokyo, Japan

[21] Appl. No.: 527,658

[22] Filed: May 18, 1990

Related U.S. Application Data

[63] Continuation of Ser. No. 216,155, Jul. 7, 1988, abandoned.

[30] Foreign Application Priority Data

Jul. 31, 1987 [JP] Japan .................. 62/116638
Jul. 31, 1987 [JP] Japan .................. 62/116639

[51] Int. Cl.⁵ .............. B21D 39/04; B23P 19/04; B23Q 3/00; F16J 15/38
[52] U.S. Cl. .................. 277/11; 29/282; 29/464; 277/81 S; 277/93 SD; 277/220
[58] Field of Search ............ 277/81 R, 81 S, 85, 277/87, 1, 9-11, 93 SD, 192, 220; 29/271, 283, 269, 468, 281.6, 282, 464

[56] References Cited

U.S. PATENT DOCUMENTS

| 865,498 | 9/1907 | Kenyon | 29/271 X |
|---|---|---|---|
| 1,956,843 | 5/1934 | Wheeler | 277/11 |
| 2,305,276 | 12/1942 | Rushmore | 277/DIG. 10 |
| 2,405,464 | 8/1946 | Storer | 277/92 X |
| 2,723,868 | 11/1955 | Hartranft | 277/81 R X |
| 2,968,864 | 1/1961 | Lee | 29/271 X |
| 3,029,503 | 4/1962 | Meyer | 29/283 |
| 3,116,066 | 12/1963 | Koppius | 277/93 SD X |
| 3,235,274 | 2/1966 | Cain et al. | 277/DIG. 10 X |
| 3,692,317 | 9/1972 | Augustin | 277/81 R |
| 3,836,158 | 9/1974 | Davison et al. | 277/199 X |
| 3,851,374 | 12/1974 | Mazelsky | 29/464 X |
| 3,947,944 | 4/1976 | Washington | 277/1 X |
| 4,576,384 | 3/1986 | Azibert | 277/81 S |
| 4,738,453 | 4/1988 | Ide | 277/81 R |

FOREIGN PATENT DOCUMENTS

| 475456 | 4/1929 | Fed. Rep. of Germany | 277/DIG. 10 |
|---|---|---|---|
| 756725 | 9/1956 | United Kingdom | 277/81 S |
| 917693 | 2/1963 | United Kingdom | 277/81 S |
| 1142327 | 2/1969 | United Kingdom | 277/81 S |
| 2033978 | 5/1980 | United Kingdom | 277/93 SD |
| 2047821 | 12/1980 | United Kingdom | 277/81 R |

*Primary Examiner*—Allan N. Shoap
*Attorney, Agent, or Firm*—Henry C. Nields

[57] ABSTRACT

A mechanial seal having a split seal ring which is covered by a support ring over the outer face with a predetermined gap and is fastened in a circular shape by a O ring inserted in the predetermined gap. The split seal ring is easily assembled by a tool which includes a split ring body. The split ring body has a basic inner face contacting to a surface of a rotary shaft, an end face contacting to the end face of the split seal ring an a projection for inserting the O ring into the gap.

6 Claims, 6 Drawing Sheets

MECHANICAL SEAL INCLUDING A SPLIT SEAL RING

This application is a continuation of application Ser. No. 216,155, filed July 7, 1988, now abandoned.

BACKGROUND OF THE INVENTION

1. Field of the Invention

The present invention relates to mechanical seals which include a split seal ring which is split into at least two segments of circular arc. There are two types of such a mechanical seal; namely, an outside seal and an inside seal. In both types of such a mechanical seal, the split seal ring has a tapered face. And the split seal ring consisting of the circular arcs is fastened by a fastening ring which presses the tapered face toward an axial direction.

Since the tapered face converts the pressing force in an axial direction to the force in an oblique direction toward the center line of the rotary shaft to fasten the split seal ring, the fastening force is not even, and such force exerts a strain on the sealing face.

It is difficult precisely to form the tapered face, and the incorrect formed tapered face causes strain on the sealing face as well. Furthermore it takes a long time to set the fastening ring precisely on the split ring.

Since conventional mechanical seals need a bolt or the like to secure the fastening ring on the split ring, it is difficult to form the rotary ring in such a split ring.

SUMMARY OF THE INVENTION

An object of the invention is to provide a mechanical seal including a split seal ring which does not produce the strain on the sealing face.

Another object of the invention is to provide a mechanical seal including a split seal ring which is easy to assemble precisely.

A further object of the invention is to provide a mechanical seal including a split seal ring in which a rotary seal ring can be formed as a split seal ring.

BRIEF DESCRIPTION OF THE DRAWINGS

FIG. 7($b$) is a perspective view of an alternative embodiment for an o-ring.

DETAILED DESCRIPTION OF THE PREFERRED EMBODIMENTS

Figure 1:
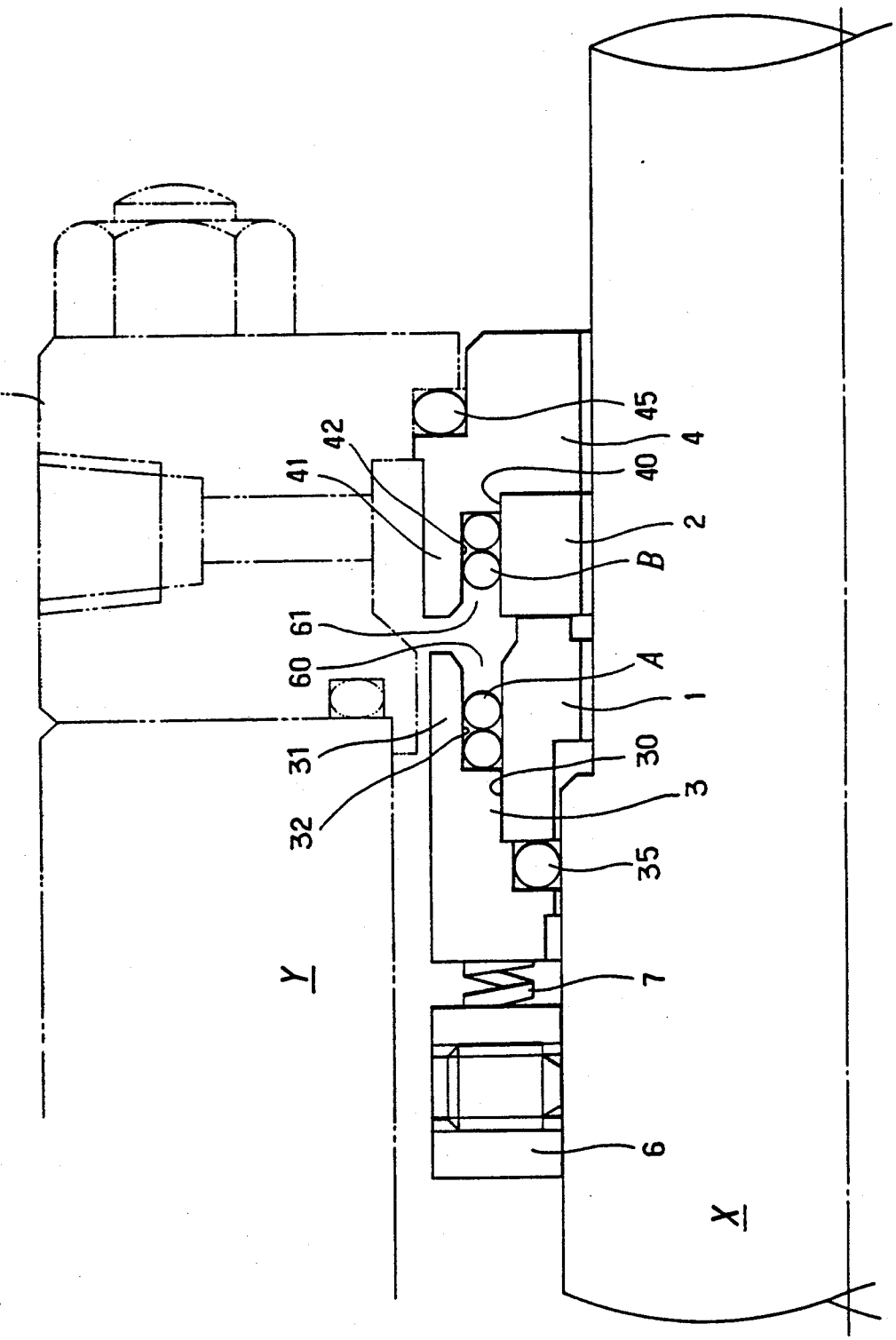
FIG. 1 is a half section view of an embodiment of the mechanical seal.
Figure 7A:
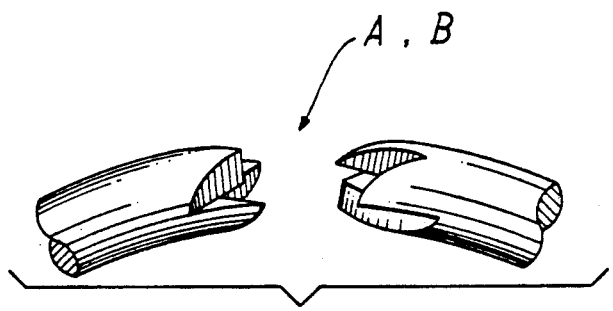
FIG. 7($a$) is a perspective view of one form of o-ring.
Figure 7B:
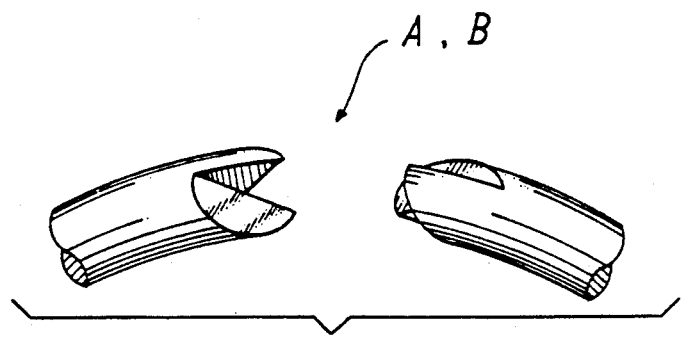

In FIG. 1, 1 indicates a slidable rotary seal ring which is split into at least two segments of circular arc, and 2 indicates a stationary seal ring which is split into at least two segments of circular arc as well. The slidable rotary seal ring 1 and the stationary seal ring 2 are preferably split by naturally breaking. The slidable rotary seal ring 1 is so inserted into a support ring 3 that a predetermined gap 60 is provided between the outer face of the slidable rotary seal ring 1 and the inner wall face 32 of the receiving wall 31 of the support ring 3. Two O rings A are inserted into the gap 60. The cross-sectional diameter of the O rings A is enough larger than the size of the gap 60 so that the O rings A fasten and integrate the circular arcs to form the slidable rotary seal ring 1 into a circular shape and hold the slidable rotary seal ring 1 in the support ring 3. At least two O rings must be inserted into the gap 60 of the slidable rotary seal ring 1, since the slidable rotary seal ring 1 receives a force which tries to open the integrated ring shape by rotation. The O rings A are cut with a plurality of cut faces (as shown in FIG. 7($a$)), or alternatively as shown in FIG. 7($b$), with engaging opposing ends forming a sealing joint A, B) at one portion, so that the O rings A may be easily set around slidable rotary seal ring 1, and the O rings A firmly seal the gap 60.

The support ring 3 has a concave portion to receive and cover the slidable rotary seal ring 1. The base part of the slidable rotary seal ring 1 is fit into a receiving concave 30 formed in the concave portion of the support ring 3. The support ring 3 is set on a rotary shaft X and sealed by an O ring 35. The support ring 3 is pressed toward the stationary seal ring 2 by a spring 7 set on a collar 6. The slidable rotary seal ring 1 is rotatable and slidable together with the support ring 3.

The stationary seal ring 2 is also inserted in a concave portion formed in a support ring 4 by a receiving wall 41 with a predetermined gap 61 between the inner wall face 42 of the receiving wall 41 and the outer face of the ring 2, into which two O rings B are inserted. The cross-sectional diameter of the O rings B is larger than the width of the gap 61 so that the stationary seal ring 2 is formed into a circular shape and the stationary seal ring 2 is held in the support ring 4 by means of the O rings B. The O rings B are also cut at one portion with a plurality of cut faces (as shown in FIG. 7($a$), or alternatively as shown in FIG. 7($b$), with engaging opposing ends forming a sealing joint A, B) for easy arrangement on the stationary seal ring 2 and to provide a firm seal. The two-O-ring embodiment shown in FIG. 1 may be modified, without departing from the scope of the invention, by using only one O ring for the stationary seal ring 2 because the stationary seal ring 2 does not rotate, and there is no force which tries to open the stationary seal ring 2. The stationary seal ring 2 is fastened integrally and so secured to the support ring 4 by O rings B that the stationary seal ring 2 cannot be rotated by friction of the slidable rotary seal ring 1 at the sealing face. Consequently neither a sort of pin to prevent rotation nor a counter pin hole are needed for the stationary seal ring 2. The base of the stationary seal ring 2 is fit into a receiving concave 40 formed in the concave part of the support ring 4. The support ring 4 is secured to a casing Y of the machine including the rotary shaft X by a gland cover 5 with an O ring 45 which forms a seal between the gland cover 5 and the support ring 4.

A mechanical seal with the above-mentioned construction has the following many advantages.

Since the O rings A and the O rings B fasten the slidable rotary seal ring 1 and the stationary seal ring 2 by force in the radial direction, the slidable rotary seal ring 1 and the stationary seal ring 2 are integrally formed by even force and no strain appears on the sealing face between the slidable rotary seal ring 1 and the stationary seal ring 2. The slidable rotary seal ring 1 and the stationary seal ring 2 do not need to be provided with tapered faces for fastening, and the outer face of the slidable rotary seal ring 1 and the inner wall face 32 of the receiving wall 31 forming the gap 60 do not need to be so precisely formed because the O rings A are flexible. The outer face of the stationary seal ring 2 and the inner wall face 42 of the receiving wall 41 forming the gap 61 do not need to be precisely formed for the same reason. Consequently the production of the slidable rotary seal ring 1, the support ring 3, the stationary seal ring 2 and the support ring 4 becomes easy. Furthermore they can be easily assembled simply by inserting the O rings A and the O rings B into the gap 60 and the gap 61. Since the stationary seal ring 2 is held by the O rings so as not to rotate as a result of the rotation of the slidable rotary seal ring 1, no pin or formation of a counter pin hole to lock against rotation are necessary.

Figure 4:
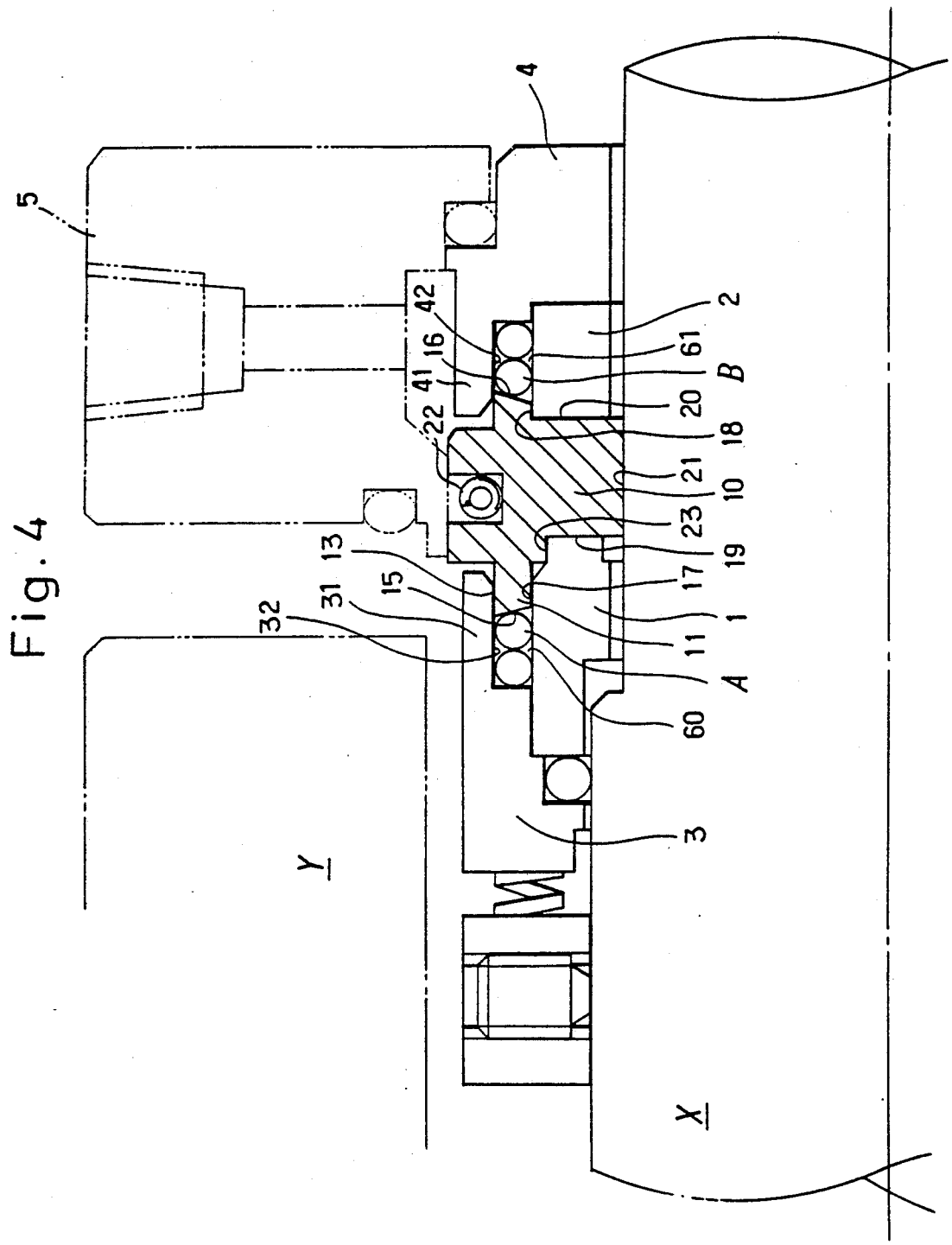
FIGS. 4 and 5 are each a half section view showing a process for assembling the mechanical seal using the tool.
Figure 6:
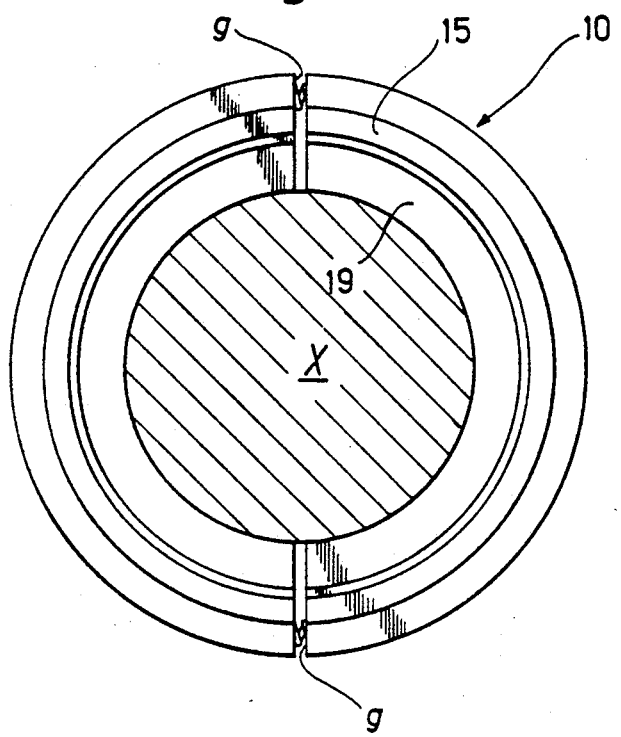
FIG. 6 is a front view showing the tool body.

FIG. 4 shows an embodiment of a tool for assembling the mechanical seal. A tool body 10 is essentially in ring shape and split into at least two segments of circular arc. The shape of the tool body 10 alone is not a perfect ring in as is shown in FIG. 6, because there are gaps g when the two segments of circular arc are placed to approximate a ring shape. Such gaps g of the tool body 10 makes it easy to hold the ring 1 or 2. The tool body 10 is fastened and formed in circular shape around the rotary shaft X by means of a spring 22 fit in a groove formed on an outer face thereof. An inner face of the tool body 10 is in close contact with the outer face of the rotary shaft X without gap and this inner face may be designated the "basic innerface" 21. The tool body 10 is slidable on the rotary shaft X. The ends of the tool body 10 include a vertical face 19 and a vertical face 20 each of which is in close contact with a sealing face of the slidable rotary seal ring 1 and the stationary seal ring 2, respectively.

At the outer sides in a radial direction of the vertical face 19 and the vertical face 20, a projection 11 and a projection 12 (see FIG. 2) are projecting in an axial direction. The outer face 13 of the projection 11 is in the same radial position as the inner wall face 32 of the receiving wall 31 of the support ring 3; therefore the outer face 13 is in close contact with the inner wall face 32. An inner face 17 of the projection 11 is in contact with the outer face of the slidable rotary seal ring 1 so that the inner face 17 adjusts the center of the slidable rotary seal ring 1 to conform to that of the rotary shaft X. The end face 15 of the projection 11 is tapered towards the center line of the rotary shaft X so that the tapered end face 15 easily inserts the O rings A under the inner wall face 32 of the receiving wall 31. At an inner part of the projection 11, is formed a second inner face 23 which is in contact with an outer face of a projecting sealing part of the slidable rotary seal ring 1.

The projection 12 (see FIG. 2) is almost the same in construction as the projection 11. An outer face 14 (see FIG. 2) of the projection 12 is the same in the radial position as the receiving wall face 42 of the receiving wall 41 of the support ring 4 so that the outer face 14 (see FIG. 2) can make contact with the receiving wall face 42. An inner face 18 of the projection 12 makes contact with an outer face of the stationary seal ring 2; therefore the inner face 18 adjusts the center of the stationary seal ring 2 to conform to the center of the rotary shaft X. A tapered end face 16 of the projection 12 faces toward the center line of the rotary shaft X, so that the tapered end face 16 can easily insert the O rings B under the receiving wall face 42.

How to install the slidable rotary seal ring 1, the stationary seal ring 2 and other elements with the support ring 3 and the support ring 4 utilizing the tool body 10 will be explained referring to FIGS. 1,2,4, and 5.

Figure 2:
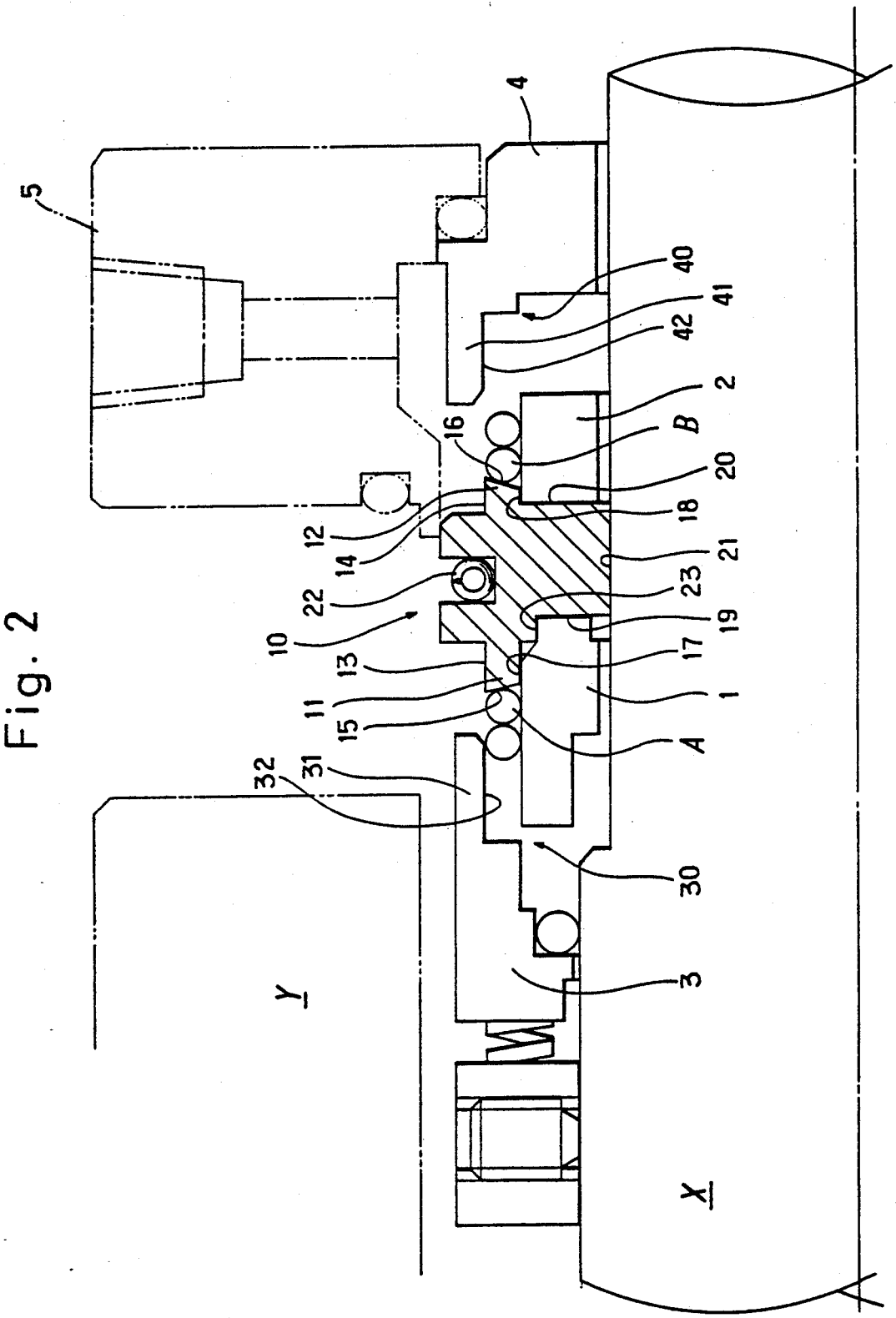
FIG. 2 is a half section view showing an embodiment of the tool for setting up the mechanical seal.
Figure 3:
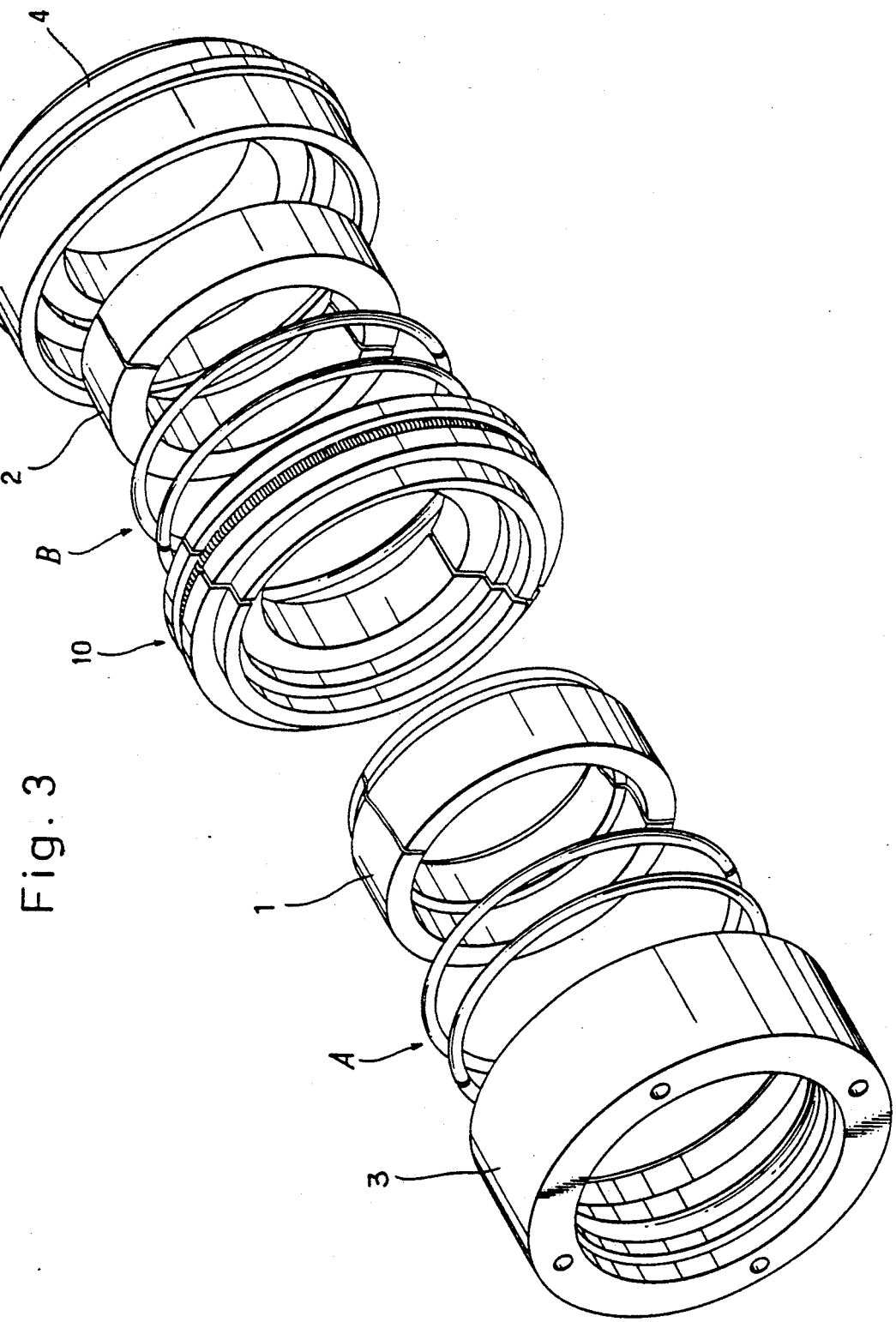
FIG. 3 is a perspective view showing a part of the mechanical seal.

At first the O rings A and the O rings B are set around the rotary shaft X and the cut ends of the O rings A and the O rings B adhered by an appropriate adhesive to form the ring shape. Then the slidable rotary seal ring 1 and the stationary seal ring 2 are set around the rotary shaft X and fastened by the O rings A and the O rings B respectively. The tool body 10 is also set between the slidable rotary seal ring 1 and stationary seal ring 2 around the rotary shaft X and fastened by setting the spring 22 at the outer face. The basic inner face 21 of the tool body 10 makes contact with the outer face of the rotary shaft X without gap. Then the tool body 10, the slidable rotary seal ring 1 and the stationary seal ring 2 are pressed and moved so as to contact each other. The slidable rotary seal ring 1 is inserted in the inner part of the projection 11 of the tool body 10 to cause the outer face of the slidable rotary seal ring 1 to contact the inner face 17. In the same manner, the stationary seal ring 2 is inserted into the inner part of the projection 12 to cause the outer face of the stationary seal ring 2 to contact the inner face 18. FIG. 2 shows this condition after finishing the above operation. Under this condition, the basic inner face 21, the inner face 17 and the inner face 18 hold the outer faces of the slidable rotary seal ring 1 and stationary seal ring 2 respectively and define the positions of the slidable rotary seal ring 1 and the stationary seal ring 2 and adjust automatically the center of the slidable rotary seal ring 1 and the stationary seal ring 2 to the center of the rotary shaft X.

Next the support ring 4 and the gland cover 5 are pressed toward the left side in FIG. 2, which inserts the O rings A and the slidable rotary seal ring 1 into the inner part of the support ring 3. Simultaneously the stationary seal ring 2 and the O rings B are inserted in the inner part of the support ring 4. By the pressing the support ring 4 and the gland cover 5, the tapered end face 15 of the projection 11 presses and inserts the O rings A into the inner side of the receiving wall 31 and the tapered end face 16 presses and inserts the O rings B into the inner side of the receiving wall 41. The O rings A and the O rings B are smoothly and strictly inserted because the tapered end face 15 and the tapered end face 16 face toward the center line of the rotary shaft X and the outer face 13 and the outer face 14 are positioned almost the same in a radial direction as the inner wall face 32 and the receiving wall face 42 respectively and they can closely contact each other. Such condition after finishing the operation is shown in FIG. 4.

Figure 5:
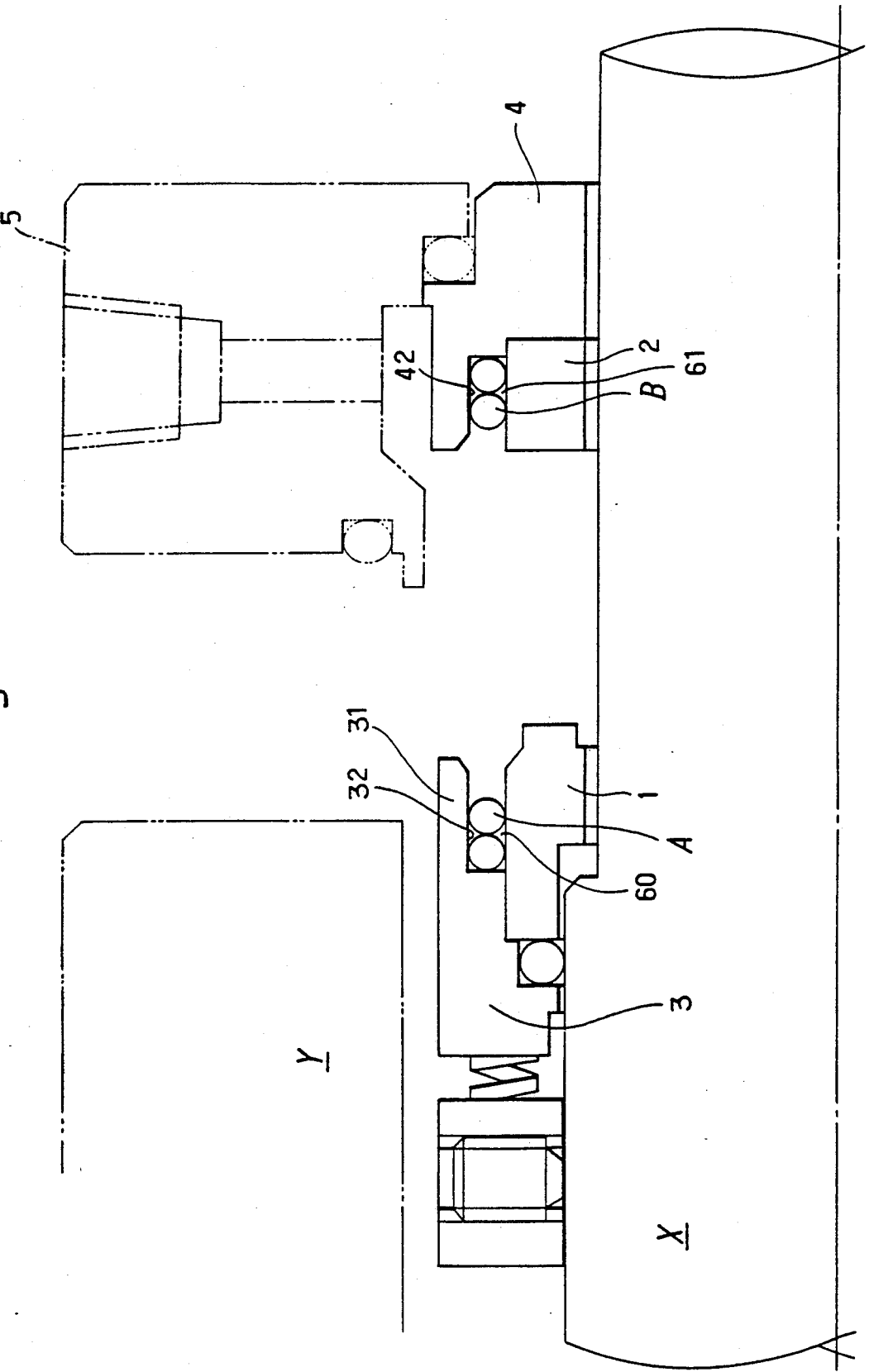

After fitting the slidable rotary seal ring 1 and the O rings A into the inner part of the receiving wall 31 and after fitting the stationary seal ring 2 and the O rings B into the inner part of the receiving wall 41, the gland cover 5 and the support ring 4 with the installed stationary seal ring 2 are shifted to the right in FIG. 4, and the tool body 10 is split again and released from the rotary shaft X by releasing the spring 22 (shown in FIG. 2) to arrive at the condition shown in FIG. 5. Then the gland cover 5 and support ring 4 with stationary seal ring 2 are moved to the left in FIG. 5 to abut the stationary seal ring 2 to the slidable rotary seal ring 1 as in the usual assembling of a mechanical seal. The gland cover 5 is then secured to the casing Y.

The tool body 10 makes the work involved in fitting the slidable rotary seal ring 1 and the support ring 3 very easy and smooth and the insertion of the O rings A and the O rings B is accomplished in one operation. The O rings A and the O rings B do not tend to be harmed and twisted. Furthermore the adjustment of the center of the slidable rotary seal ring 1 and the stationary seal ring 2 to the center of the rotary shaft X is automatically accomplished. Thus precision of assembling can be developed.

We claim:

1. A mechanical seal having two seal rings which forms a rotatably sliding sealing face comprising:
    a first seal ring which is split in at least two circular-arc-segments,
    a support ring which receives said first ring and covers over an outer face of said first seal ring with a predetermined gap which has an opening to receive a removable tool to force at least two O rings into abuttingly adjacent relationship therein so as to secure said first ring to said support ring even after said tool is removed,
    said O rings being abuttingly adjacent each other and inserted into the gap between said first seal ring and the support ring which fastens said first seal ring so as to form a circle, the cross-sectional diameter of each said O ring being enough larger than the size of the gap so that each said O ring fastens and integrates said two segments into a circular shape, whereby substantial sliding of said first seal ring with respect to said support ring is prevented and whereby said O rings firmly seal said gap, and
    a second seal ring.

2. A mechanical seal claimed in claim 1 wherein; the O ring is cut by a plurality of surfaces.

3. A mechanical seal for a rotatable shaft, said seal having two seal rings which form a rotatably sliding sealing face comprising:
    a first seal ring which is slidably mountable about said rotatable shaft and which is split in at least two circular-arc-segments,
    a support ring which is slidably mountable about said rotatable shaft and which receives said first ring and covers over an outer face of said first seal ring with a predetermined gap which has an opening to receive a tool to insert at least two O rings into abuttingly adjacent relationship therein,
    said O rings being abuttingly adjacent each other and inserted into the gap between said first seal ring and the support ring which fastens said first seal ring so as to form a circle, the cross-sectional diameter of each said O ring being enough larger than the size of the gap so that each said O ring fastens and integrates said two segments into a circular shape, whereby substantial sliding of said first seal ring with respect to said support ring is prevented and whereby said O rings firmly seal said gap,
    a second seal ring, and
    means for pressing said support ring toward said second seal ring whereby said support ring may slide along said shaft.

4. The mechanical seal in accordance with claim 3, wherein said support ring is mountable upon said rotatable shaft so as to rotate therewith.

5. A mechanical seal in accordance with claim 3, wherein said second seal ring is mountable for rotation with said rotatable shaft and said support ring is mountable to prevent rotation with said rotatable shaft.

6. In combination with a mechanical seal having two seal rings which forms a rotatably sliding sealing face, a removable tool for setting up the mechanical seal to a rotary shaft, said mechanical seal comprising (1) a first seal ring which is split in at least two circular-arc-segments, (2) a support ring which receives said first ring and covers over an outer face of said first seal ring with a predetermined gap which has an opening to receive said removable tool to force at least two O rings into abuttingly adjacent relationship therein so as to secure said first ring to said support ring even after said tool is removed, said O rings being abuttingly adjacent each other and inserted into the gap between said first seal ring and the support ring which fastens said first seal ring so as to form a circle, the cross-sectional diameter of each said O ring being enough larger than the size of the gap so that each said O ring fastens and integrates said two segments into a circular shape, whereby substantial sliding of said first seal ring with respect to said support ring is prevented and whereby said O rings firmly seal said gap, and (3) a second seal ring,
    said tool being removable from said seal after insertion of said O rings and comprising a ring body which is split into at least two segments of a circular arc, including a basic inner face adapted to contact a surface of the rotary shaft, an end face adapted to contact an end face of the split seal ring and a projection which is adapted to be inserted into the gap between the split seal ring and the support ring, said projection having (a) an inner face which is adapted to contact the outer face of the split seal ring, (b) an outer face which is adapted to contact the inner face of the support ring, and (c) a tapered end face which is tapered toward the center line of the rotary shaft for pressing and inserting the O rings into the gap.

* * * * *